US 6,647,260 B2
Nov. 11, 2003

(54) METHOD AND SYSTEM FACILITATING WEB BASED PROVISIONING OF TWO-WAY MOBILE COMMUNICATIONS DEVICES

(75) Inventors: Steve Dusse, Woodside, CA (US); Peter F. King, Half Moon Bay, CA (US); Bruce V. Schwartz, San Mateo, CA (US); Bruce K. Martin, Jr., Palo Alto, CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/289,559

(22) Filed: Apr. 9, 1999

(65) Prior Publication Data

US 2002/0068554 A1 Jun. 6, 2002

(51) Int. Cl.[7] .......................... H04M 3/00; G06F 15/16; H04L 9/00
(52) U.S. Cl. ....................... 455/419; 455/411; 709/219; 713/169
(58) Field of Search ................. 455/419, 418, 455/414, 466, 411, 517, 410; 370/338, 352, 401, 402, 403, 404, 313; 709/218, 219, 223, 225, 227; 713/168, 169, 201

(56) References Cited

U.S. PATENT DOCUMENTS

| | | | | |
|---|---|---|---|---|
| 5,485,505 A | * | 1/1996 | Norman et al. | 455/419 |
| 5,586,260 A | * | 12/1996 | Hu | 713/201 |
| 5,603,084 A | * | 2/1997 | Henry, Jr. et al. | 455/419 |
| 5,673,322 A | | 9/1997 | Pepe et al. | |
| 5,719,918 A | | 2/1998 | Serbetciouglu et al. | 455/466 |
| 5,727,159 A | * | 3/1998 | Kikinis | 709/246 |
| 5,732,074 A | * | 3/1998 | Spaur et al. | 370/401 |
| 5,742,905 A | | 4/1998 | Pepe et al. | 455/461 |
| 5,809,415 A | * | 9/1998 | Rossmann | 370/352 |
| 5,812,953 A | * | 9/1998 | Griffith et al. | 455/550 |

(List continued on next page.)

FOREIGN PATENT DOCUMENTS

| | | | | |
|---|---|---|---|---|
| EP | 0 804 045 | * | 10/1997 | H04Q/7/22 |
| EP | 1043905 | | 10/2000 | |
| EP | 1091606 | | 4/2001 | |
| WO | 95/15065 | | 6/1995 | H04Q/7/32 |
| WO | 97/13382 | * | 4/1997 | H04Q/7/22 |
| WO | 97/28662 | | 8/1997 | H04Q/7/22 |
| WO | 98/58506 | * | 12/1998 | H04Q/7/22 |
| WO | 99/07173 | | 2/1999 | H04Q/7/38 |
| WO | 01/39526 A1 | * | 5/2001 | H04Q/7/06 |

OTHER PUBLICATIONS

"Mobile Management Server", pp. 1–4, downloaded from http://www.phone.com/products/mms/html on Mar. 5, 2001.

Primary Examiner—William Trost
Assistant Examiner—Rafael Perez-Gutierrez
(74) Attorney, Agent, or Firm—Blakely, Sokoloff, Taylor & Zafman LLP

(57) ABSTRACT

A system and method for provisioning a two-way mobile communications device having a display screen and user interface that is initiated from the device to be provisioned. The device to be provisioned establishes a secure communications session with a provisioning server device. The subject communications path may utilize an intermediate server device. The user of the device is then presented with a plurality of input and choice screens, which may be used in conjunction with the user interface to provide user information, select device features and services. The user information and selected feature and service requests are then forwarded to the provisioning server device. The provisioning server device processes the received information and generates provisioning packages, registration requests, and notifications for the subject mobile device and for any associated server device providing services. The provisioning packages may comprise software modules, parameters and any required security information.

42 Claims, 9 Drawing Sheets

U.S. PATENT DOCUMENTS

| | | | |
|---|---|---|---|
| 5,841,764 A | | 11/1998 | Roderique et al. ........... 370/310 |
| 5,848,064 A | * | 12/1998 | Cowan ........................ 370/338 |
| 5,875,394 A | * | 2/1999 | Daly et al. .................. 455/419 |
| 5,943,399 A | * | 8/1999 | Bannister et al. ........ 379/88.17 |
| 5,956,636 A | * | 9/1999 | Lipsit .......................... 455/419 |
| 6,031,830 A | * | 2/2000 | Cowan ........................ 370/338 |
| 6,049,821 A | * | 4/2000 | Theriault et al. ........... 709/203 |
| 6,065,120 A | * | 5/2000 | Laursen et al. ............. 713/201 |
| 6,138,009 A | * | 10/2000 | Birgerson ................... 455/419 |
| 6,138,158 A | * | 10/2000 | Boyle et al. ................ 709/219 |
| 6,148,405 A | * | 11/2000 | Liao et al. .................. 713/201 |
| 6,151,628 A | * | 11/2000 | Xu et al. .................... 713/201 |
| 6,173,316 B1 | * | 1/2001 | De Boor et al. ............. 709/219 |
| 6,195,366 B1 | * | 2/2001 | Kayashima et al. ......... 370/401 |
| 6,195,546 B1 | * | 2/2001 | Leung et al. ................ 455/419 |
| 6,195,547 B1 | * | 2/2001 | Corriveau et al. ........... 455/419 |
| 6,233,608 B1 | * | 5/2001 | Laursen et al. ............. 709/217 |
| 6,253,326 B1 | * | 6/2001 | Lincke et al. ............... 713/168 |
| 6,275,693 B1 | * | 8/2001 | Lin et al. .................... 455/414 |
| 6,295,291 B1 | * | 9/2001 | Larkins ....................... 709/219 |
| 6,343,323 B1 | * | 1/2002 | Kalpio et al. ................ 709/217 |
| 6,421,781 B1 | * | 7/2002 | Fox et al. .................... 713/201 |
| 2001/0032254 A1 | * | 10/2001 | Hawkins ...................... 709/219 |
| 2002/0068554 A1 | * | 6/2002 | Dusse ......................... 455/419 |

* cited by examiner

METHOD AND SYSTEM FACILITATING WEB BASED PROVISIONING OF TWO-WAY MOBILE COMMUNICATIONS DEVICES

BACKGROUND OF THE INVENTION

1. Field of the Invention

The present invention relates to two-way mobile communication devices and, more particularly, to a method and system for provisioning the features and services available to the two-way mobile communication devices.

2. Description of the Related Art

For persons and businesses requiring instant access to information, the Internet and Intranets have provided a vehicle for near real-time delivery of information from an enormous number of sources. For many of those same individuals, two-way mobile communication devices (e.g., cellular phones, two-way pagers, Personal Digital Assistants (PDAs), and handheld computing devices) have provided a means for communicating irrespective of locality. It was only natural for these two exploding mediums to come together in a manner such that two-way mobile communication devices have become one of a plurality of entry vehicles into the Internet and Intranets.

The current generation of two-way mobile communication devices have microprocessors, information storage capability, and run one or more software applications. Examples of software applications used in these devices include micro-browsers, address books, and email clients. Additionally, this generation of two-way mobile communication devices has access to a plurality of services via the Internet and Intranets.

Before a consumer can use one of these devices, a number of parameters must be provisioned into the device in order to enable communication services and applications and in order to distinguish the device from others within the communications network. In addition to provisioning the two-way mobile communication device, it is also necessary to provision network elements in the communications network which are responsible for effecting mobile communications services and applications (e.g., billing plan, voice mail, call forwarding, email, information services etc.).

As with any other service-related industry, consumers demand convenience in the provisioning process. From the consumer's perspective it would be preferable to be able to walk into a store and select from an assortment of devices and services without being pressured by a sales person pushing a particular device or service.

Unfortunately, there are other concerns that effect the manner and procedures involved in provisioning the two-way mobile communications devices and services. Fraud is a $1 billion dollar problem for the telecommunications industry. In 1997, about $600 million was lost due to cloning fraud and another $400 million was lost from subscription fraud (Corsair Communications).

Thus, there exists a need for a method and system for provisioning two-way mobile communications devices and services that is convenient for consumers and secure for the service providers and device manufacturers.

SUMMARY OF THE INVENTION

In view of the above, it is one of the objects in the present invention to provide a method and system for provisioning two-way mobile communications devices and services that provides convenience for consumers without compromising the carrier's and service provider's sensitive provisioning information.

According to one aspect of the present invention, a system and method for provisioning a two-way mobile communications device having a display screen and user interface that is initiated from the device to be provisioned. The device to be provisioned establishes a secure communications session with a provisioning server device. The subject communications path may utilize an intermediate server device. The user of the device is then presented with a plurality of input and choice screens, which may be used in conjunction with the user interface to input user information and select device features and services. The user information and selected features and services are then forwarded to a provisioning server device. The provisioning server device processes the received information and generates provisioning content and notifications for the subject mobile device and for any associated server device providing service(s). The provisioning packages may be comprised of software modules and any required security information.

According to another aspect of the present invention, a system and method for provisioning a two-way mobile communications device having a display screen and user interface that is initiated from a remote server device. The remote server device establishes a secure communications session with a provisioning server device and provides the provisioning server with user information and features and services for which the two-way mobile communications device is to be provisioned for. The provisioning server device processes the received information and generates provisioning packages and notifications for the two-way mobile communications device and for any associated server device providing services. Preferably the provisioning packages may comprise software modules, parameters, and any required security information. User information may be provided to the remote server device through a system utilizing a telephone and an Interactive Voice Response Unit (IVRU) or from a user to a representative who forwards the information to the provisioning server device.

The advantages of the invention are numerous. Different embodiments or implementations may yield one or more of the following advantages. One advantage of the present invention is that the user of a two-way mobile communications device can initially provision features and services without having to go to a retail establishment. Another advantage of the present invention is that the user can change the features and services associated with their two-way mobile communications device after the initial provisioning. Still another advantage of the present invention is that the carrier can remotely change the features and services associated with a two-way mobile communications device and provide a system for notifying the user of the changes made.

Other aspects and advantages of the invention will become apparent from the following detailed description taken in conjunction with the accompanying drawings, which illustrate by way of example, the principles of the invention.

BRIEF DESCRIPTION OF THE DRAWINGS

The present invention will be readily understood by the following detailed description in conjunction with the accompanying drawings, wherein like referenced numerals designate the structural elements, and in which.

DETAILED DESCRIPTION OF THE INVENTION

The invention pertains to systems and methods, which enables the provisioning of a two-way mobile communications device having a display screen and user interface. According to one embodiment of the present invention, a provisioning transaction is initiated by a request to a provisioning server device from the two-way mobile communications device to be provisioned. The provisioning request may be forwarded through a proxy server device, which acts as a trusted third party in authenticating the principle participants. The provisioning request includes information input by the user using the user interface and device identification information resident in the mobile communication device. User input information may include personal identification information and financial information (e.g., credit card numbers, bank account numbers etc.) requiring verification by an outside processing entity (e.g., TRW). Upon verification of the user information and the device information, the provisioning server device processes the provisioning request. This processing may require the delivery of software modules and registration information to the provisioned two-way mobile communications device and any server devices (e.g., service servers) providing service. During the process, the user of the device may receive notifications relating to the state of processing and the services and features provisioned. These notifications may be pushed to the provisioned device through a narrow-band data channel (e.g., Short Message Service (SMS)).

The two-way mobile communication device, also referred to as two-way interactive communication devices, wireless client devices, and mobile devices, include but are not limited to personal digital assistants, palm-sized computing devices, cellular phones, two-way pagers, and wireless capable remote controllers. Such devices typically have significantly less memory and processing capability than is found in desktop and laptop computers. These mobile devices typically have a small display screen and a keypad with a reduced character set, as opposed to the full function keyboards and monitors associated with desktop or laptop computers.

Embodiments of the invention are discussed below with reference to FIGS. 1–7C. However those skilled in the art will readily appreciate that the detailed description given herein with respect to these figures is for exemplary purposes as the invention extends beyond the embodiments discussed below.

Figure 1:
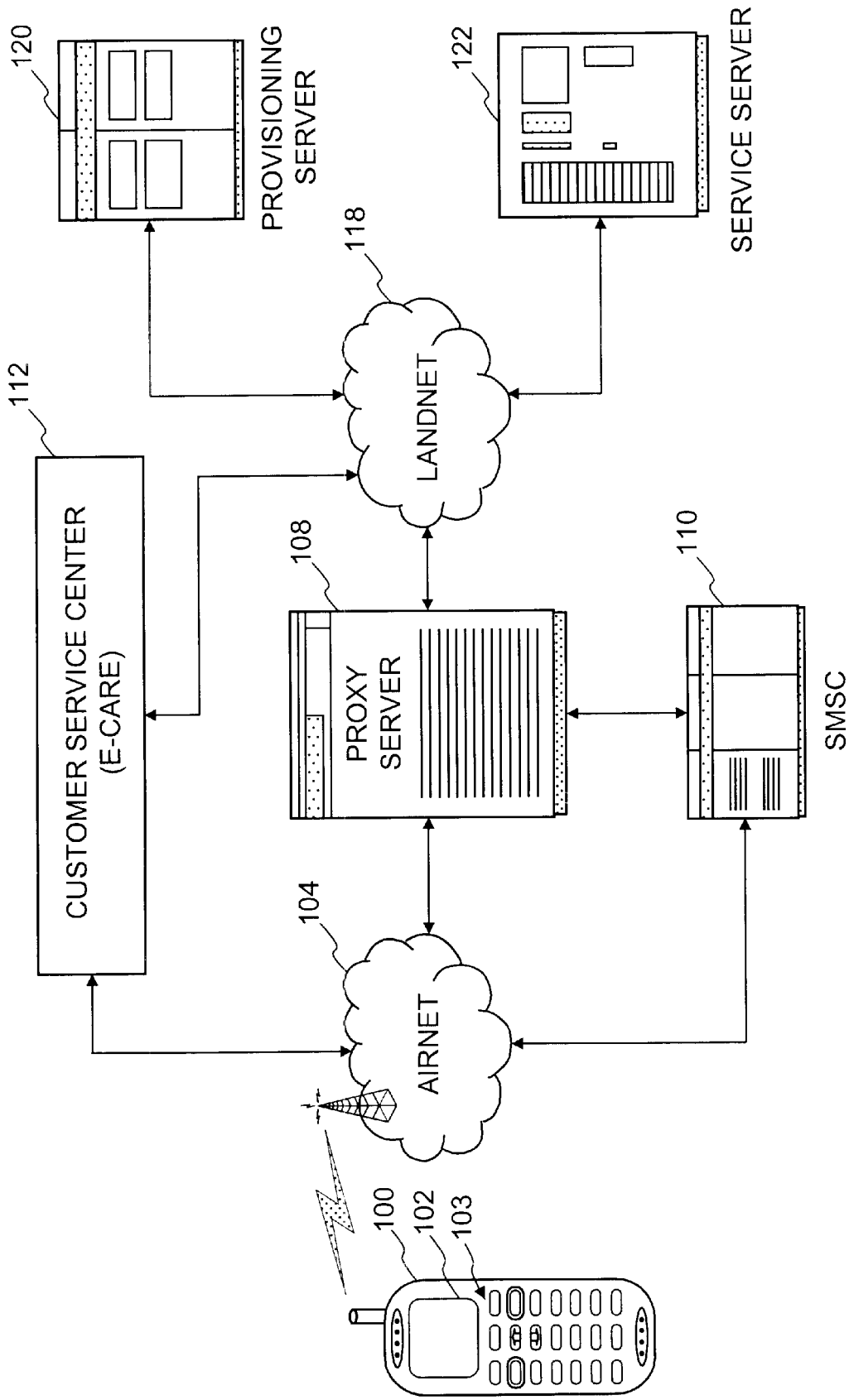
FIG. 1 illustrates a communications system, which may be utilized to practice the present invention.

To facilitate a description of the present invention, it is deemed necessary to recite some of the features of a communications system in which the invention may be practiced. Referring to FIG. 1 a block diagram of a typical communications system according to one embodiment of the present invention is displayed. Mobile device 100 (e.g., a cellular telephone, a two-way pager, a personal digital assistant, or a palm-sized computer) receives phone calls through a voice communications channel and hypermedia information (e.g., Hyper Text Markup Language (HTML) documents, Compact Hypertext Transport Protocol (cHTML) documents, Extensible Markup Language (XML) documents, Handheld Device Markup Language (HDML) documents, or Wireless Markup Language (WML) documents) from remote server devices through broad-band and narrow-band (e.g., SMS) data communications channels which may include proxy server device 108 and Short Message Service center (SMSC) 110. Mobile device 100 has a display 102 and a user interface 103. Additionally, mobile device 100 may have a micro-browser (e.g., a micro-browser from Unwired Planet, Inc. 800 Chesapeake Drive, Redwood City, Calif., 94063) stored in a local memory which enables it to process hypermedia information received from remote server devices.

Information is exchanged between mobile devices 100 and remote server devices (e.g., provisioning server 120 and service server 122) using airnet 104 and landnet 118. Airnet 104 may be, for example, a cellular digital packet data network (CDPD), a Global System for Mobile (GSM) network, a Code Division Multiple Access (CDMA) network, a Time Division Multiple Access (TDMA) network, a Personal Digital Cellular (PDC) network or a Personal Handy-phone System (PHS) network. The communications protocols used by airnet 104 may, for example, be Wireless Access Protocol (WAP) or Handheld Device Transport Protocol (HDTP). Landnet 118 is a land-based network that may be the Internet, an Intranet or a data network of any private network. Typically the communication protocol supporting landnet 118 may be Transmission Control Protocol (TCP/IP), Hypertext Transport Protocol (HTTP), or Secure Hypertext Transport Protocol (sHTTP).

The data communication path between airnet 104 and landnet 118 may be bridged by proxy server device 108, which coordinates the exchange of information on the wide-band and narrow-band communications channels providing communication with mobile device 100. The narrow-band channel may be used for the exchange of content requiring limited bandwidth transmission services (e.g., Short Message Service (SMS)) and the wide-band channel is used for all other exchanges. An additional server device (e.g., Short Message Service Center (SMSC)) 110 generally coordinates communications on the narrow-band channel.

Proxy server device 108 and SMSC 110 may be, for example, a SPARC workstation from Sun Microsystems, Inc. (http://www.sun.com). As previously stated proxy server device 108 acts as a bridge between airnet 104 and remote devices connected by landnet 118. It should be pointed out, however, that the functions of proxy server device 108 and SMSC 110 may be performed by network server devices connected to landnet 118 with hardware well known in the art providing the connection between airnet 104 and landnet 118.

According to one embodiment of the present invention, mobile device 100 is initially unprovisioned when obtained (e.g., at a retail store or via the mail) by a user. When mobile device 100 is initially turned on a communications session is established with proxy server device 108 and a provisioning application is activated which displays scripts on display screen 102 of mobile device 100 prompting the user to input provisioning related information via user interface 103. The provisioning related information and pre-stored device identification information (also referred to as a provisioning request herein) are forwarded to provisioning server 120 via proxy server device 108 using a secure communications session. The secure communications session is facilitated by a previously stored uniform resource identifier (URI) associated with provisioning server 120 and authentication services provided by proxy server device 108.

The provisioning request contains information relating to the mobile device features and services desired by the user. Additionally, the provisioning request may contain the accounting information (e.g., credit card information, bankcards etc.) used to establish a user account. The provided accounting information can be verified by applications resident on provisioning server 120 or by outside financial services, which are accessible via landnet 118 (e.g., TRW). Once the information in the provisioning request is verified, provisioning content is forwarded to mobile device 100 and provided to any network element (e.g., service server 122) providing service to mobile device 100 as a result of the services requested. Additionally, the user may be provided with periodic status updates relating to the processing of the provisioning request and information relating to the features and services actually provisioned.

Mobile device 100 is pre-provisioned with the content required to communicate with an automated Customer Service Center (E-CARE) 112 via data and voice communications channels. The E-CARE center 112 may provide assistance to the user during the provisioning process. One embodiment of an E-CARE center is disclosed in U.S. patent application Ser. No. 09/093,944 entitled "Visual Interface to Mobile Account Services" and is hereby incorporated by reference.

Figure 2:
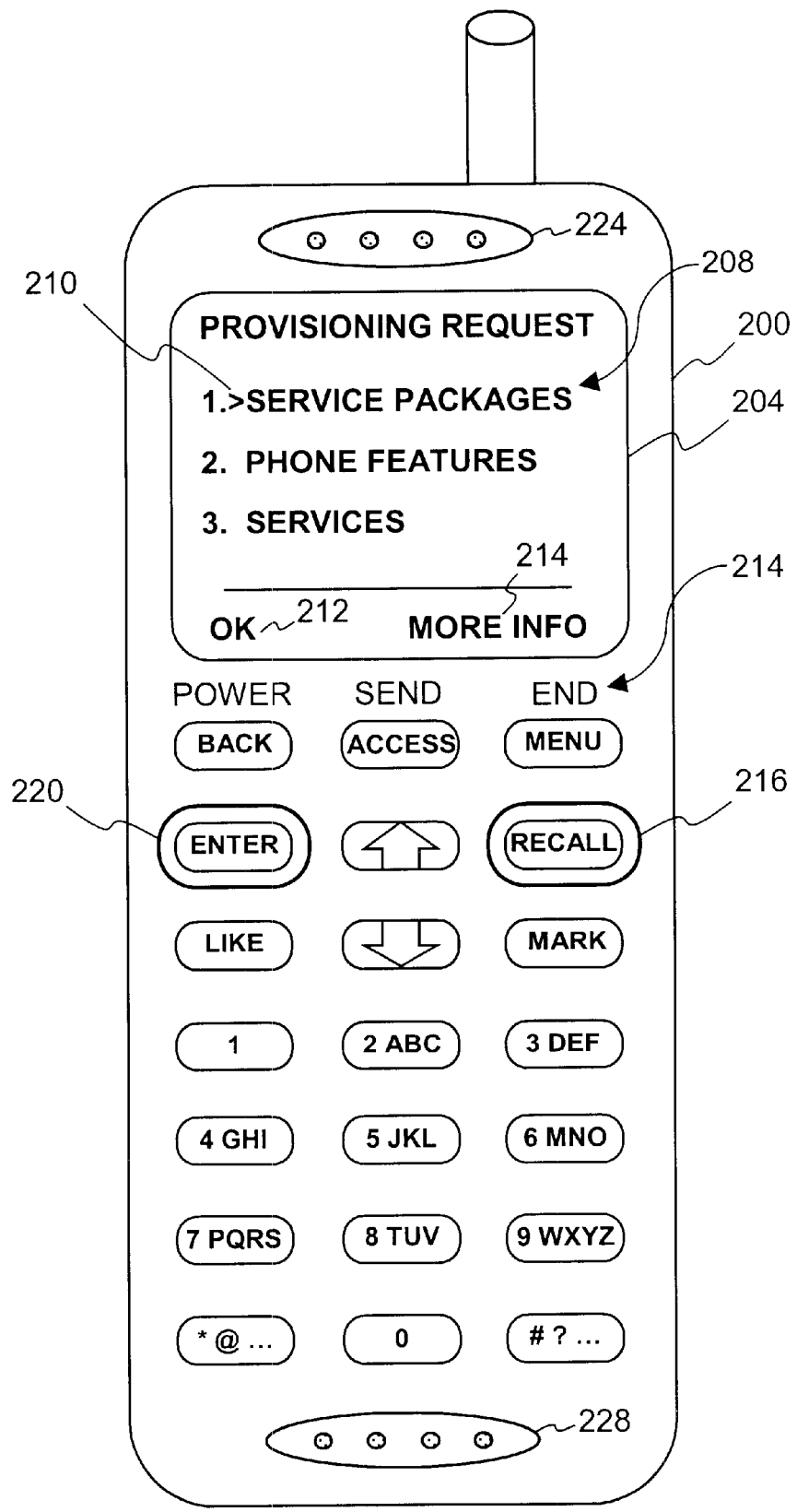
FIG. 2 illustrates a schematic of a two-way mobile communications device according to an embodiment of the present invention.

With reference now to FIG. 2, mobile device 200 (e.g. a cellular telephone, a two-way pager, a personal digital assistant, or a palm-sized computer) comprises a display screen 204, a user interface 216, a speaker 224, and microphone 228. Display screen 204 contains hyper media information 208, a hypermedia selection identifier ">"210 and softkey identifiers 212 and 214. User interface 214 has function keys (e.g., "MENU", "BACK"), alphanumeric keys, and navigation keys (↑ and ↓). Additionally, function keys 216 and 220 are utilized for soft key inputs.

Hypermedia information 208 is illustrative of the type of an entry screen relating to the provisioning application. Hypermedia information 208 is comprised of a plurality of selectable identifiers corresponding to selections available in the provisioning application. It is important to note that each of the identifiers is associated with a Uniform Resource identifier (URI) and the associated URIs may be for the same provisioning server device or different provisioning server devices. The navigation keys (↑ and ↓) are used to navigate the list of selectable identifiers where hypermedia selection identifier ">" 210 indicates the selected item. The provisioning application allows the user to pick and chose desired device features and services (selections 2 and 3 on screen 204) or to select predetermined device and service configurations (selection 1 on screen 204).

Figure 3:
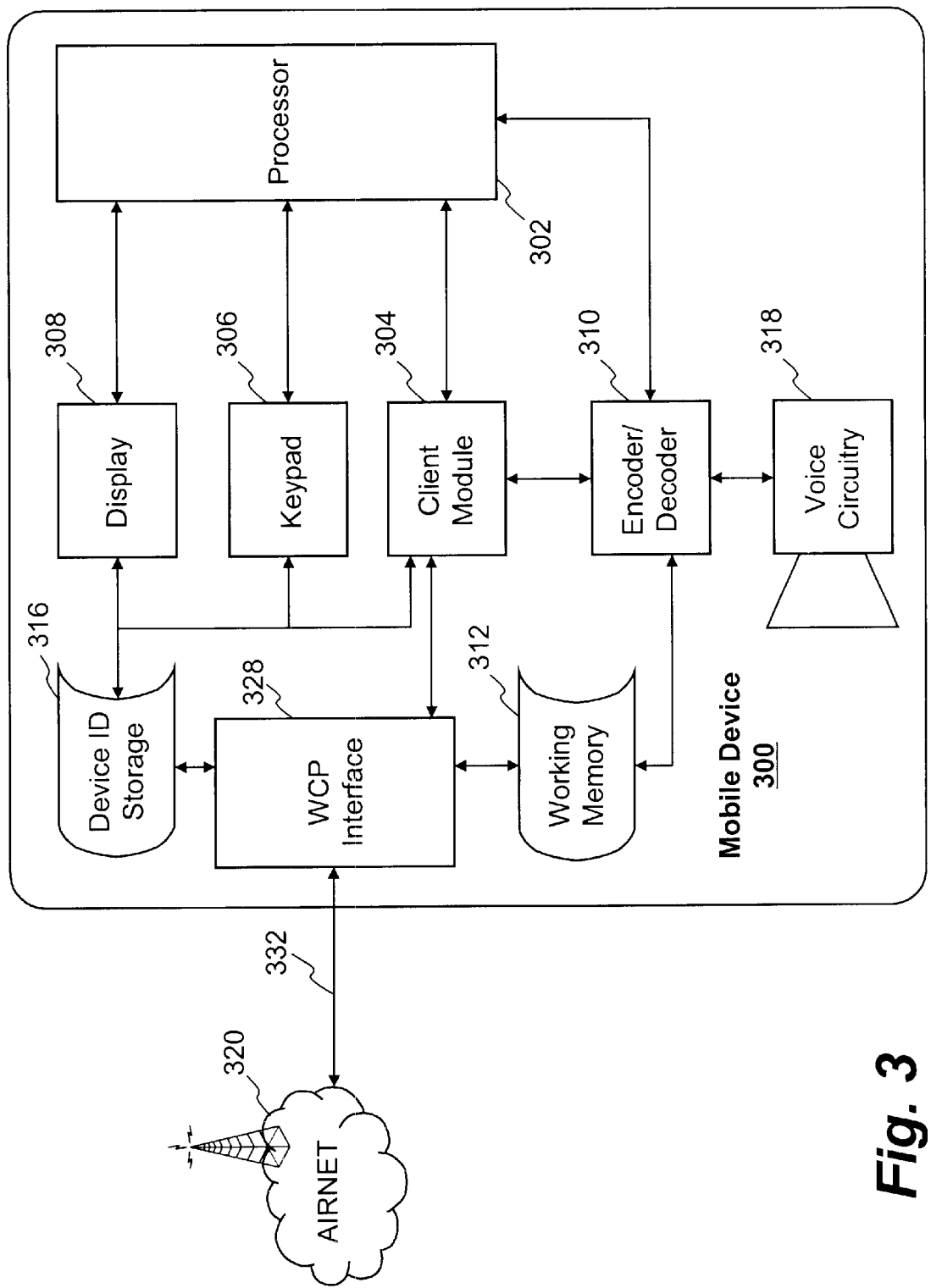
FIG. 3 illustrates a block diagram of the principle components of an exemplary two-way mobile communications device.

Referring now to FIG. 3, a more detailed description of mobile device 300, which may be mobile device 100 of FIG. 1, is provided. Mobile device 300 includes memory 312 that stores data and/or software for performing many of the functions of the device 300 when executed by a processor 302. Mobile device 300 also includes a Wireless Control Protocol (WCP) interface 328 that couples to a carrier network via airnet 320 to receive incoming and outgoing signals. Device identifier (ID) storage 316 stores and supplies a device ID to WCP interface 328 for the purpose of identifying mobile device 300 to outside entities (e.g., proxy server device 108 of FIG. 1). The device ID identifies a specific code that is associated with mobile device 300 and directly corresponds to the device ID in the user account typically provided in an associated proxy server device (e.g., 108 of FIG. 1). In addition, mobile device 300 includes a client module 304 that performs many of the processing tasks performed by mobile device 300 including: establishing a communication session with a proxy server device via airnet 320, operating and maintaining a resident address book, displaying information on a display screen 308 thereof, and receiving user input from keypad 306. The client module 304 is coupled to WCP interface 328 for the establishment of a communication session and the requesting and receiving of data. The device 300 further includes voice circuitry 318 for inputting and outputting audio, and an encoder/decoder 310 coupled between processor 302 and voice circuitry 318 for encoding and decoding audio signals.

Figure 4:
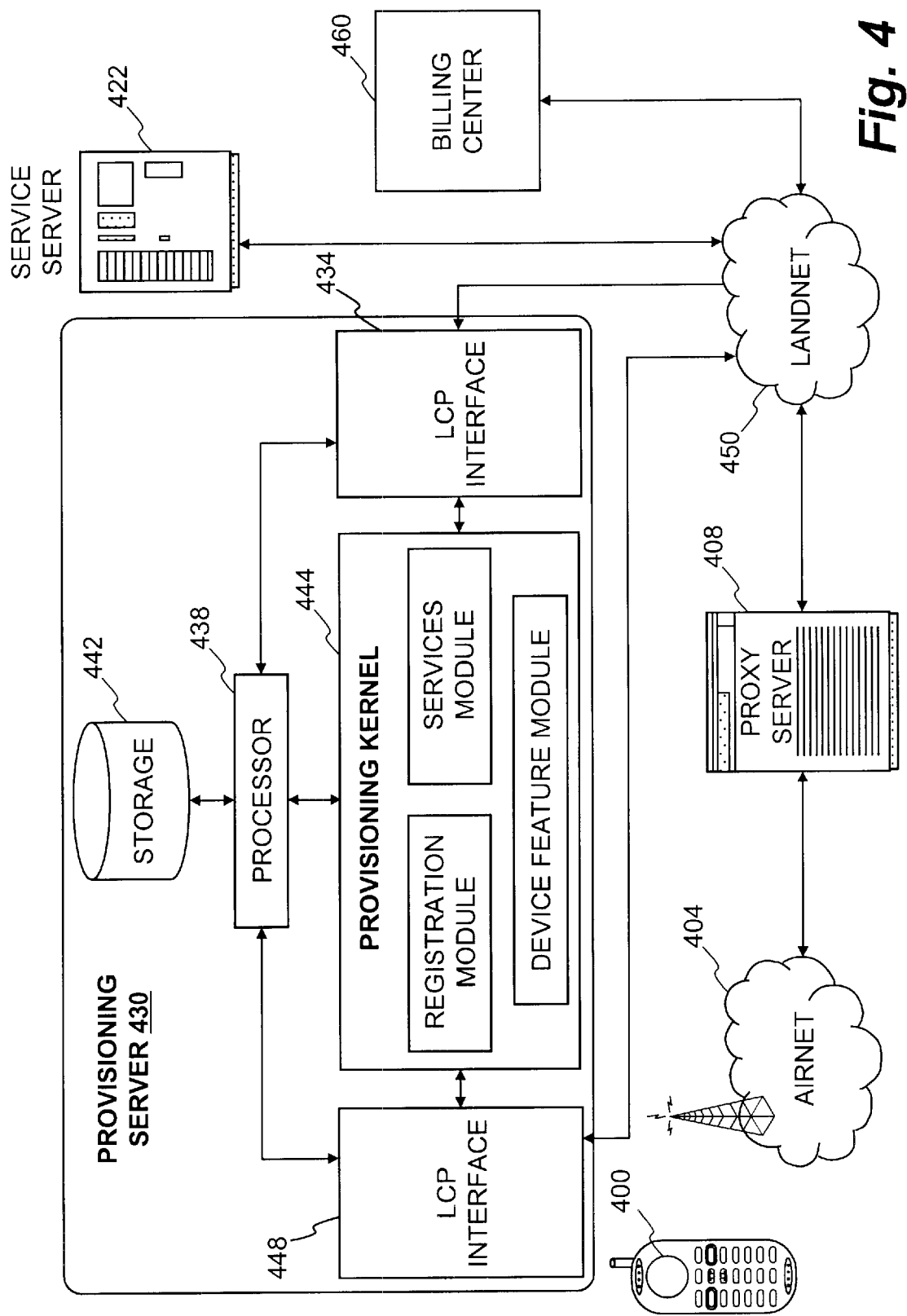
FIG. 4 schematically illustrates the relationship between the provisioning server and the other system components.

FIG. 4 schematically illustrates the relationship between the provisioning server 430, which may correspond to provisioning server 120 of FIG. 1, and the other components of the communications system. It is important to note at this point that the functions of provisioning server 430 may be incorporated in proxy server device 408 or another device with direct or indirect access to airnet 404. Provisioning server 430 is comprised of Land Control Protocol (LCP) interfaces 434 and 448, processor 438, storage device 442 and a provisioning kernel 444 comprised of a plurality of software modules. More specifically, the provisioning kernel is comprised of a Registration Module, a Services Module, and a Device Feature Module.

The Registration Module coordinates the processing of the provisioning request in terms of verifying the request components (e.g., device identification information, accounting and information) and matching the requested device features and services with available features and services. It is important to note at this point that the provisioning content required to process the request may be resident on the provisioning server receiving the request or on any server device accessible via landnet 450.

Provisioning content relating to mobile device features are retrieved from the Device Feature Module. The provisioning content relating to requests for device features takes the form of software modules, which modify the resident features of mobile device 400 or activation information required to initialize previously installed non-operational applications. Once the features of mobile device 400 have been provisioned, a notification is provided to billing center 460. The provisioned features are also displayed on the display of mobile device 400.

Provisioning content relating to services are retrieved from the Services Module. The provisioning content relating to requests for services takes the form of a request to register a new user. This request is comprised of the URI of service server providing the service (e.g., service server 422) and registration information relating to the user of mobile device 400. Once mobile device 400 has been registered, a notification is provided to billing center 460. Additional notifications and information required to access the provisioned services (e.g., passwords) are sent to mobile device 400 through a narrow band channel (e.g., an SMS message).

Figure 5:
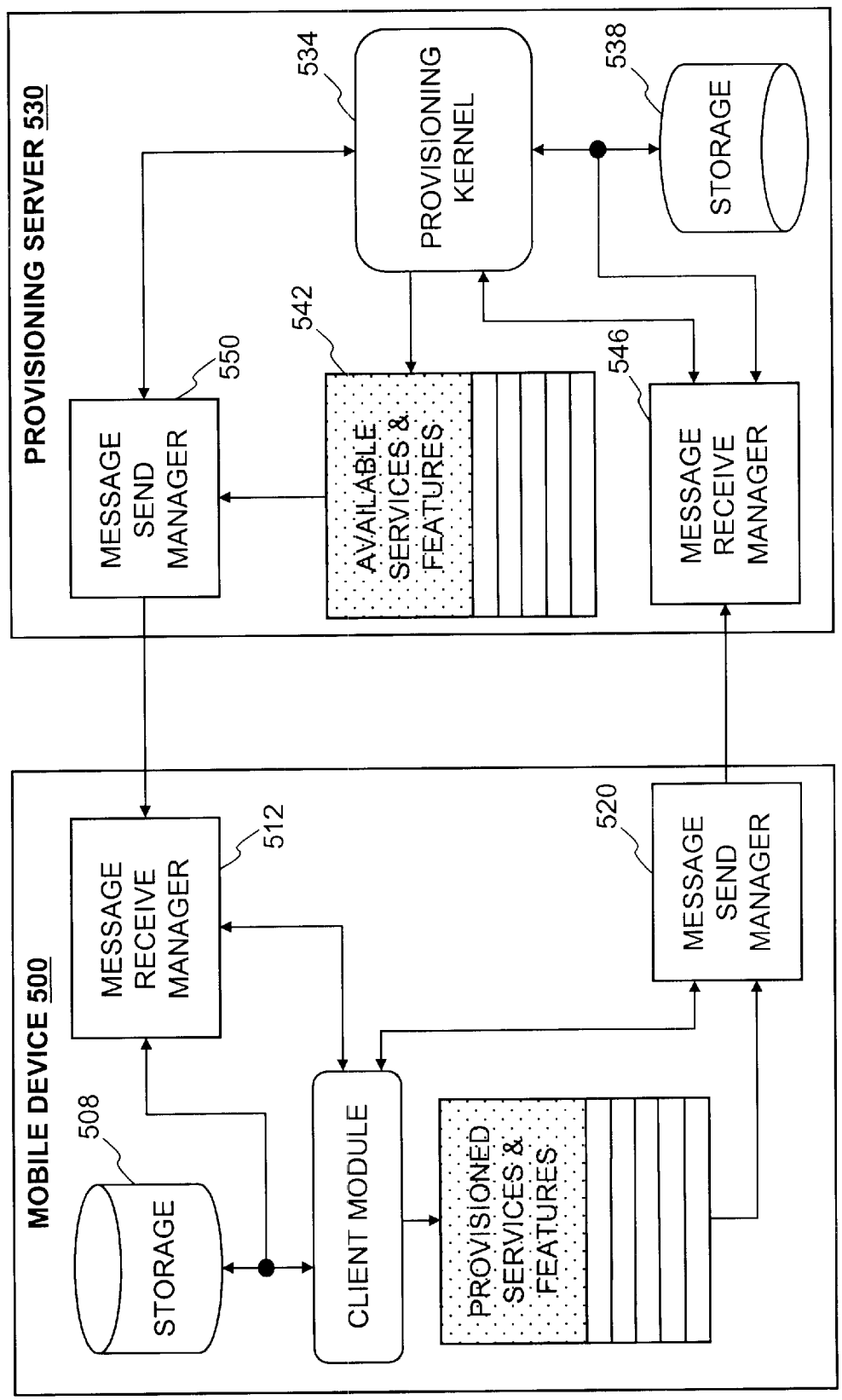
FIG. 5 schematically illustrates the mechanism for exchanging information between the two way mobile communications device and the provisioning server.

FIG. 5 schematically illustrates the exchange of provisioning content between mobile device 500, which may be mobile device 100 of FIG. 1 and provisioning server 530, which may be provisioning server 120 of FIG. 1. Mobile device 500 generates a provisioning request which is then forwarded to provisioning server 530 via the message send manager 520 resident in mobile device 500 and the message receive manager 546 resident in provisioning server 530. As previously stated, information relating to the mobile device (e.g., a pre-stored device identification number) and information required to establish a user account (e.g., credit card information) are verified prior to processing the provisioning request if the phone has not previously been provisioned. The information verification process can be performed by applications resident in provisioning kernel 534 using information stored in storage device 538. Additionally the verification process can be performed by outside entities accessible through a landnet (e.g., the Internet or an Intranet).

The provisioning request received from mobile device 500 contains requests for specific device features and services. Applications resident within provisioning kernel 534 match the requested features and services with available features and services listed in database 542. The content relating to the features and services listed in database 542 need not be resident on provisioning server 530. The content may be resident on a remote server device accessible through a landnet (not shown). If requested features or services are not resident within database 542 or if there is some conflict with the features or services requested then a notification message (e.g., SMS message) is sent to mobile device 500. Content relating to matching device features and services is forwarded to the requesting mobile device via message send manager 550 and message receive manager 512 and is stored in storage 508. The content may be comprised of software modules and information required to communicate with limited access commercial server devices. Additionally, mobile device 500 is registered with the limited access server devices providing requested services and registered with a billing entity.

Figure 6:
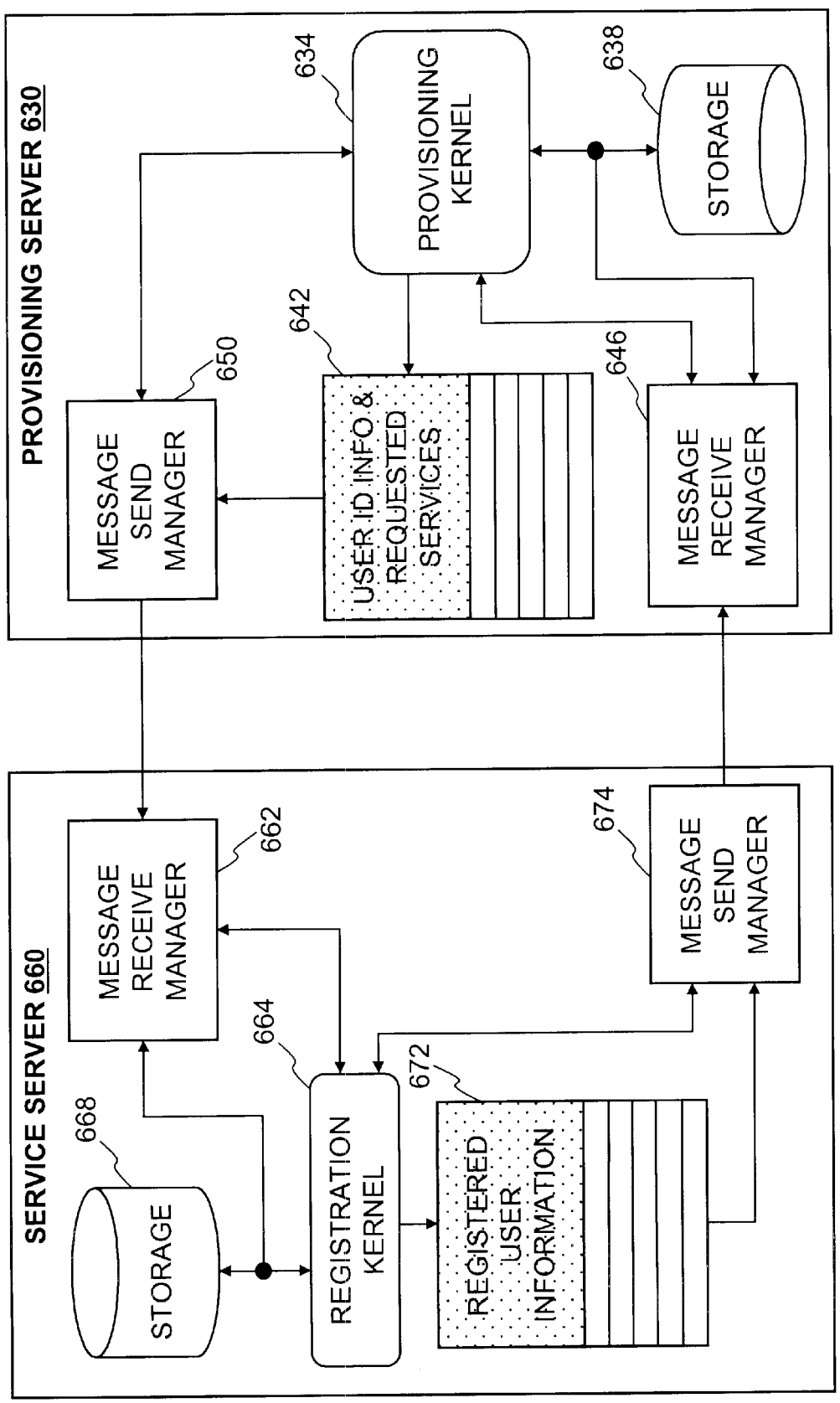
FIG. 6 schematically illustrates the mechanism for exchanging information between a service server and the provisioning server.

FIG. 6 schematically illustrates the exchange of information between service server 660, which may be service server 122 of FIG. 1 and provisioning server 630, which may be provisioning server 120 of FIG. 1. Provisioning server 630 forwards a user registration request to service server 660 via a message send manager 650 and message receive manager 662. Provisioning server 630 and service server 660 are connected by a landnet (e.g., the Internet or an Intranet) which is not shown in the drawing. Mutual authentication of the participants involved in the transaction are by methods well known in the art. User information and information relating to requested services is stored in database 642. The information is forwarded to service server 660 where it is stored in storage 668 and used to register the user for the requested services. Acknowledgments regarding the user's registration and provisioning content 672 (e.g. passwords security information, etc.) are forwarded to provisioning server 630 by a registration kernel 664 via message send manager 674 and message receive manager 646. Provisioning server 630 forwards the provisioning content and any related notifications to the requesting mobile device.

Once the initial device features and services are provisioned, account information is registered with a billing entity. Changes to the features or services may be initiated at any time by the user or by an authorized administering entity using the systems and methods described above. Corresponding changes to the billing account will be made concurrently. Additionally, offers relating to feature and service upgrades can be forwarded to the device user via a narrowband channel (e.g., an SMS message).

It is important to note at this point that the exchange of information between the mobile device requesting provisioning (e.g., 100 of FIG. 1), the provisioning server (e.g., 120 of FIG. 1) and the service server (e.g., 122 of FIG. 1) is conducted using mutually exclusive secure communications sessions. In effect the provisioning server acts as a trusted third party in registering the requesting mobile device with the service server providing the requested service.

Figure 7A:
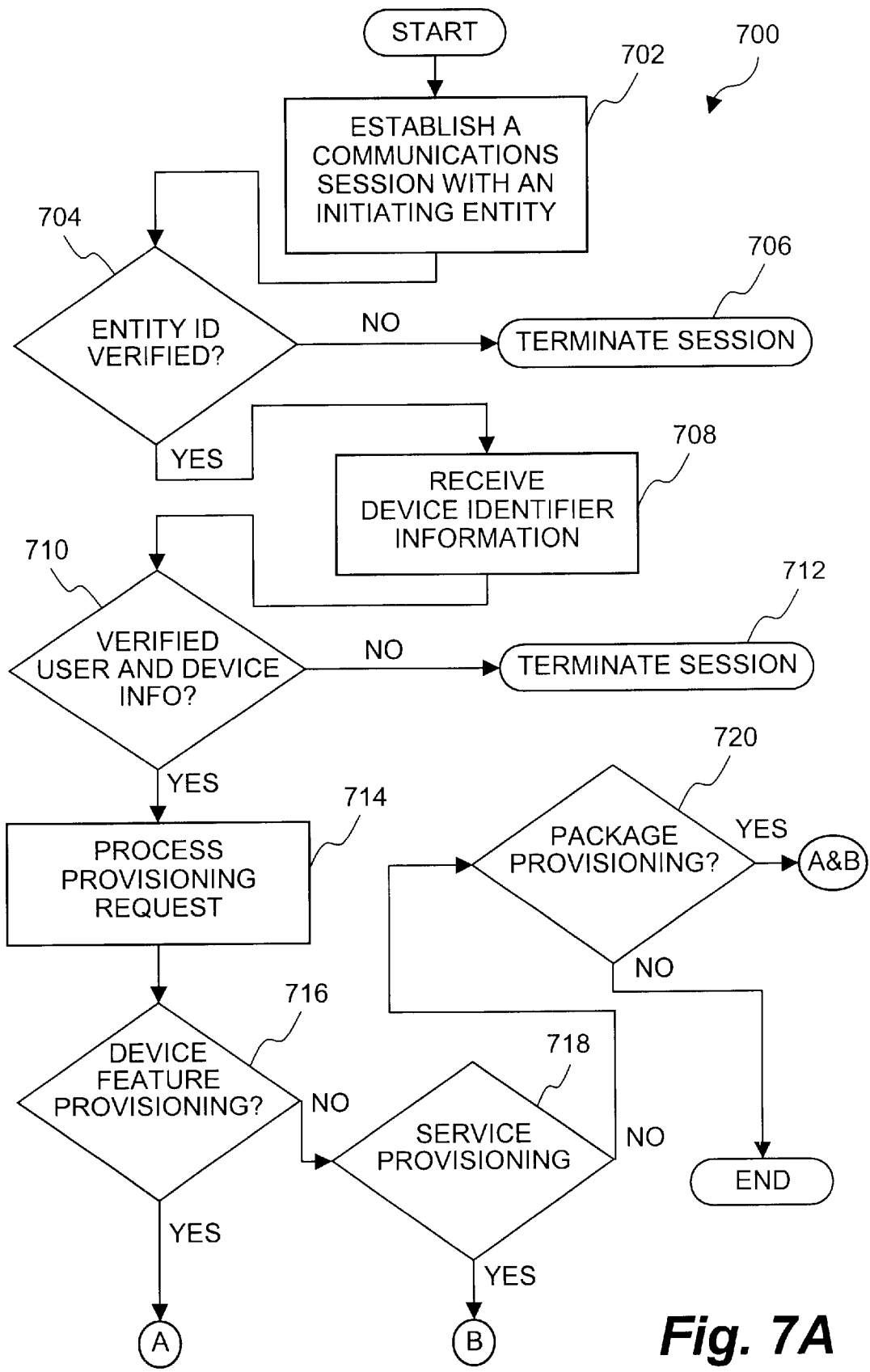
FIG. 7A is a flow chart, which describes a two-way mobile communications device request for provisioning.

FIG. 7A illustrates a process flow chart which describes the process 700 used by a mobile device (e.g., mobile device 100 of FIG. 1) to generate a provisioning request. At 702 a secure communications session is established between the requesting mobile device and the provisioning server (e.g., provisioning server 120 of FIG. 1). At 704 the identity of both participants is mutually authenticated. If mutual authentication fails the session is terminated at 706. If mutual authentication is successful, the device identification information and user information are forwarded, at 708, to the provisioning server where they are verified at 710. If either the device information or the user information fails the verification process then the session is terminated at 712. If the verification process is successful then the provisioning request is processed at 714. Feature provisioning (716-A) is described in FIG. 7B, service provisioning (718-B) is described in FIG. 7C and package provisioning provisions, at 720, a predetermined group of features and services using the process described in FIGS. 7B and 7C.

Figure 7B:
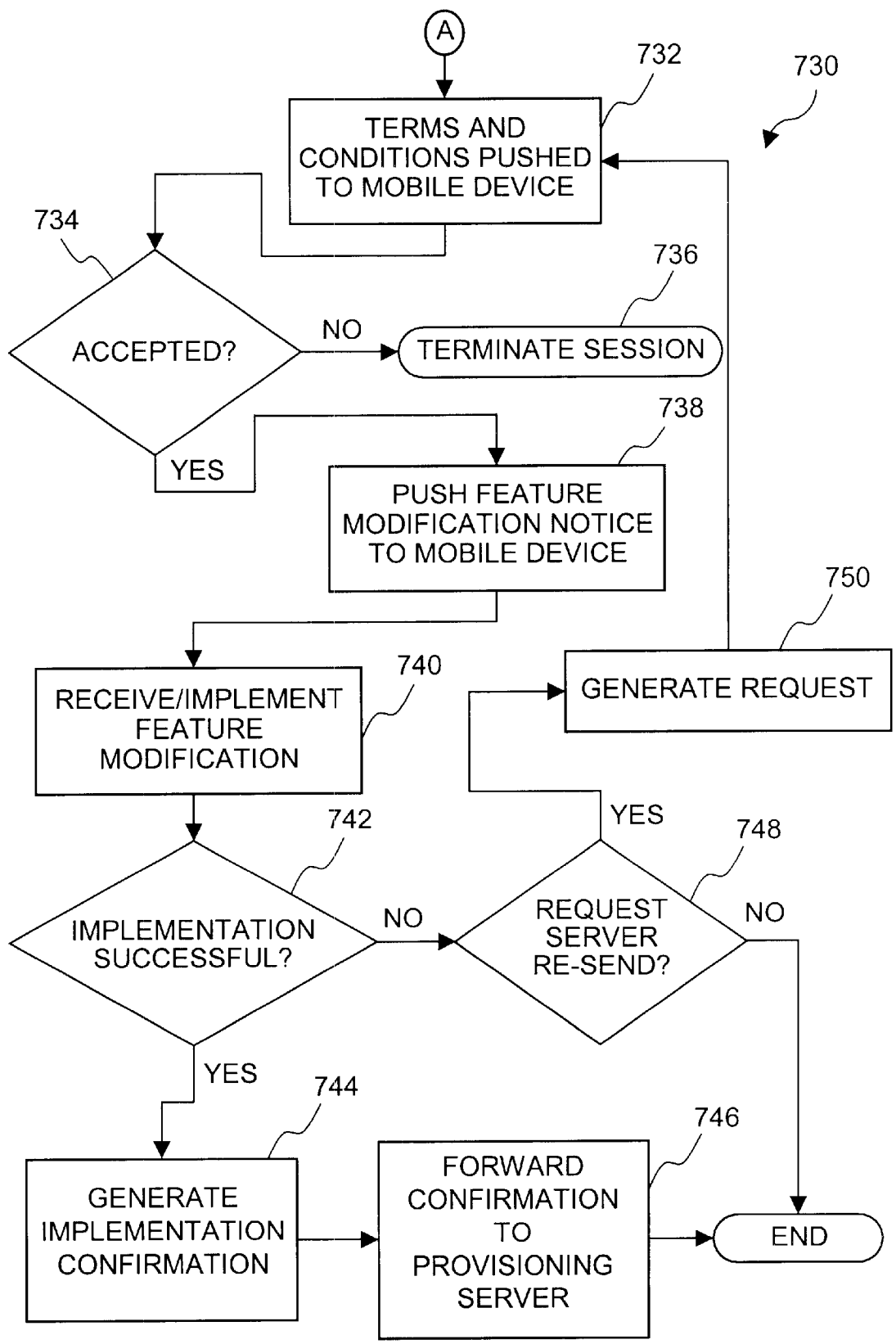
FIG. 7B is a flow chart, which describes the provisioning of the features requested by the two-way mobile communications device.

Referring now to FIG. 7B, the process 730 of feature provisioning is described. Upon processing of the provisioning request, terms, conditions, and related information notifications are pushed to the requesting mobile device using the narrowband channel (e.g., an SMS message) at 732 for approval by the user prior to implementation. Additionally this information may forwarded to the user through a predetermined email address or facsimile number. If the user declines at 734, then the session is terminated at 736. If the user accepts then, at 738, a notification to that effect is forwarded to the requesting mobile device through a narrowband channel and the provisioning content is forwarded to the mobile device via a wideband channel. The provisioning content is provisioned at 740 and a determination is made at 742 as to whether the provisioning content was implemented successfully. If the implementation fails then the user has the option of requesting a retransmission at 748 via a request generated at 750. If the implementation is successful then a confirmation message is generated at 744 and forwarded to the provisioning server at 746.

Figure 7C:
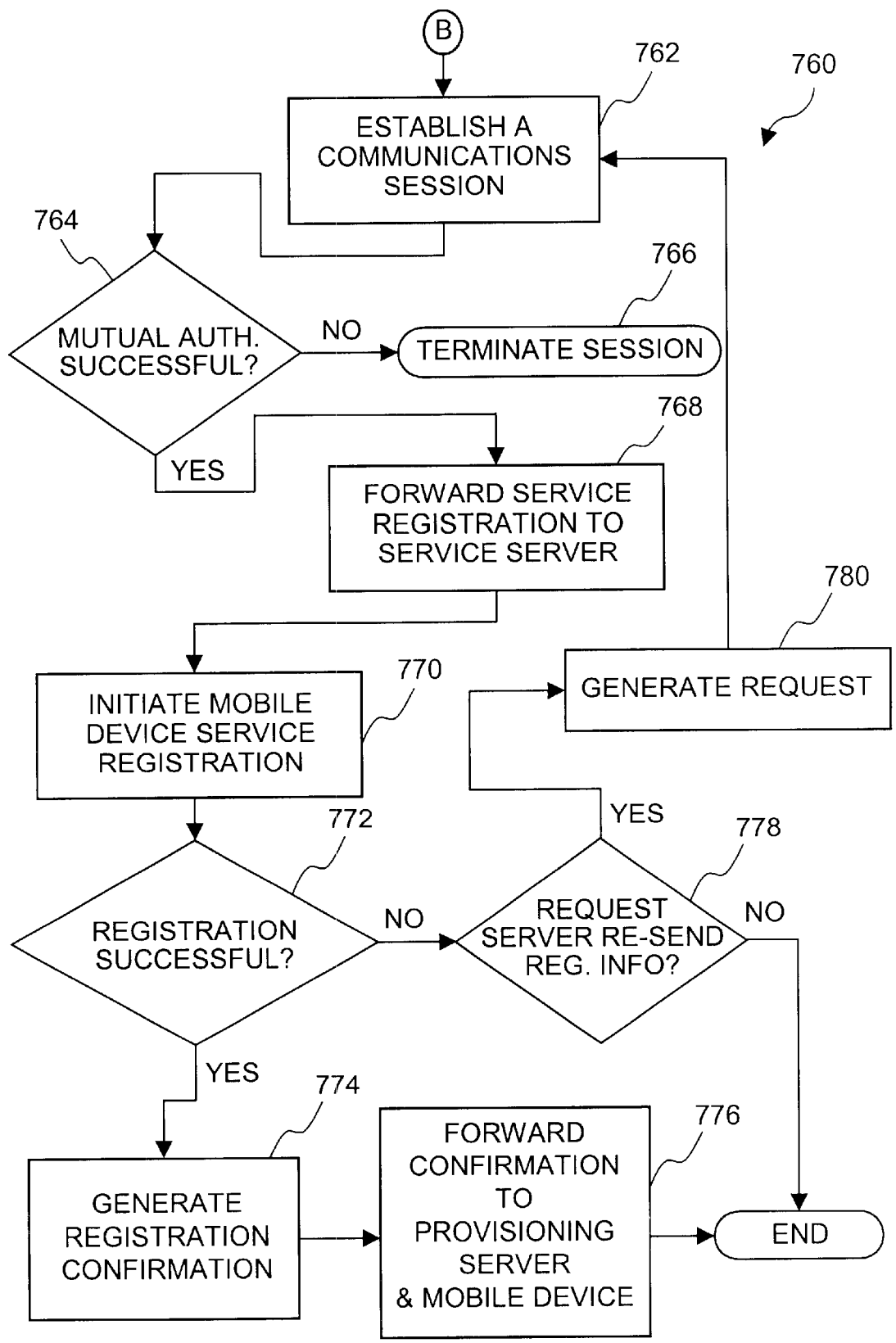
FIG. 7C is a flow chart, which describes the provisioning of the services requested by the two-way mobile communications device.

Referring now to FIG. 7C the process 760 utilized by the provisioning server (e.g., 120 of FIG. 1) to register a requesting mobile device (e.g., 100 of FIG. 1) with a server device providing service (e.g., 122 of FIG. 1) is described. At 762 a communications session is established between the provisioning server and the service server where the two are subjected to a mutual authentication process at 764. If the mutual authentication process fails then the session is terminated at 766. If mutual authentication is successful then user registration information is forwarded to the service server 768. The registration request is processed at 770 and if the device is successfully registered (772) then a registration confirmation notification is generated at 774 and forwarded to the provisioning server at 776. If registration fails (772) due to corrupted registration information or missing information then the user has the option of re-sending a registration request at 778. This is done by the service server which generates a request for the missing or corrupted information at 780.

The present invention has been described in sufficient detail with a certain degree of particularity. It is understood to those skilled in the art that the present disclosure of embodiments has been made by way of example only and that numerous changes in the arrangement and combination of parts as well as steps may be resorted without departing from the spirit and scope of the invention as claimed. Accordingly, the scope of the present invention is defined by the appended claims rather than the foregoing description of one embodiment.

What is claimed is:

1. A method for provisioning a two-way mobile communications device having a display and a user interface, the method being performed by the two-way mobile communications device and comprising:

receiving user information required to establish a user account;

displaying a list of selectable identifiers on the display, each selectable identifier corresponding to a selectable service or feature for which the two-way mobile communications device can be provisioned;

receiving a user's selection of a selectable identifier from the list;

generating a provisioning request comprising the user information and the user's selection;

establishing a communications link with a provisioning server;

providing authentication information to enable a remote server to authenticate the two-way mobile communications device;

sending the provisioning request to the provisioning server over the communications link;

receiving a reply to the provisioning request; and provisioning the two-way mobile communications device with a feature or service based on the reply.

2. The method of claim 1, wherein receiving the reply comprises receiving software to enable the services; and provisioning the two-way mobile communications device comprises installing the software in the two-way mobile communications device.

3. The method of claim 1, wherein receiving the reply comprises receiving activation information to render operational previously installed non-operational software in the two-way mobile communications device.

4. The method of claim 3, wherein provisioning the two-way mobile communications device comprises activating the non-operational software with the activation information.

5. The method of claim 1, wherein establishing the communications link with the provisioning server is accomplished via a wide area communications network.

6. The method of claim 5, wherein the wide area communications network comprises the Internet.

7. The method of claim 6, wherein establishing the communications link is accomplished via a proxy server.

8. The method of claim 7, wherein the proxy server acts as a gateway to bridge communications between an airnet with which the two-way mobile communications device communicates and the wide area communications network with which the provisioning server communicates.

9. The method of claim 8, wherein the remote server, the proxy server, and the provisioning server are included in a single server device.

10. The method of claim 9, wherein the selectable identifiers further correspond to selectable service packages, each package comprising predetermined feature and services configurations for the two-way mobile communications device.

11. The method of claim 10, wherein each selectable identifier comprises an identifier of a corresponding provisioning server.

12. The method of claim 11, wherein the identifier is a uniform resource locator.

13. The method of claim 1, wherein receiving the reply comprises receiving terms and conditions on which a service provider is prepared to provide services.

14. The method of claim 13, further comprising receiving the user's approval of the terms and conditions; and forwarding the user's approval to the provisioning server.

15. The method of claim 1, wherein receiving the reply comprises receiving a notification indicating which services and features have been provisioned.

16. The method of claim 1, wherein receiving the reply comprises receiving a notification relating to a state of processing of the provisioning request.

17. The method of claim 1, wherein establishing the communications link comprises establishing a secure communications link.

18. The method of claim 1, wherein receiving the reply is accomplished on a narrow band channel.

19. The method of claim 18, wherein the narrow band channel is an SMS channel.

20. A provisioning server comprising a processor and a memory coupled thereto, the memory storing instructions which when executed by the processor cause the processor to perform a method comprising:

receiving an authentication request from a proxy server;

sending authentication information to the proxy server in response to the authentication request;

receiving a provisioning request from a two-way mobile communications device as a forwarded message from the proxy server, the provisioning request comprising user information required to establish a user account, device information identifying the two-way mobile communications device, and a user selection indicating a user's selection of services to be provisioned;

verifying the user information and device information; and provisioning the two-way mobile communications device with the user's selection of services.

21. The provisioning server of claim 20, wherein provisioning the two-way mobile communications device comprises generating notifications relating to terms and conditions associated with a service in the user selection; forwarding the generated notifications to the two-way mobile communications device; and receiving user acceptance of the terms and conditions.

22. The provisioning server of claim 20, wherein provisioning the two-way mobile communications device comprises establishing a communications link with a service server providing a service which has been requested in the provisioning request; and sending a request to the service server requesting registration of the user for the service.

23. The provisioning server of claim 22, wherein the communications link is a secure communication link.

24. The provisioning server of claim 20, wherein provisioning the two-way mobile communications device comprises sending activation information required to activate previously stored non-operational applications in the two-way mobile communications device.

25. The provisioning server of claim 20, wherein provisioning the two-way mobile communications device comprises sending software modules to the two-way mobile communications device to enable the requested services.

26. A method for processing a provisioning request from a two-way mobile communications device, the method comprising:
- receiving at a provisioning server, an authentication request from a proxy server;
- sending authentication information to the proxy server in response to the authentication request;
- receiving the provisioning request from the two-way mobile communications device as a forwarded message from the proxy server, the provisioning request comprising user information required to establish a user account, device information identifying the two-way mobile communications device, and a user selection indicating a user's selection of services to be provisioned;
- verifying the user information and device information; and
- provisioning the two-way mobile communications device with the user's selection of services.

27. The method of claim 26, wherein provisioning the two-way mobile communications device comprises generating notifications relating to terms and conditions associated with a service in the user selection; forwarding the generated notification to the two-way mobile communications device; and receiving user acceptance of the terms and conditions.

28. The method of claim 26, wherein provisioning the two-way mobile communications device comprises establishing a secure communications link with a service server providing a service which has been requested in the provisioning request; and sending a request to the service server requesting registration of the user for the service.

29. The method of claim 26, wherein provisioning the two-way mobile communications device comprises sending activation information required to activate previously stored non-operational applications in the two-way mobile communications device.

30. The method of claim 26, wherein provisioning the two-way mobile communications device comprises sending software modules to the two-way mobile communications device to enable the requested services.

31. The method of claim 26, wherein the provisioning server is connected to a landnet and the proxy server bridges communications between the landnet and an airnet to which the two-way mobile communications device is connected.

32. The method of claim 26, wherein the user selection further comprises the user's selection of features of the two-way mobile communications device the user wishes activated.

33. A method for provisioning a two-way mobile communications device, the method comprising:
- receiving a provisioning request from the two-way mobile communications device;
- mutually authenticating the two-way mobile communications device and a provisioning server; and
- forwarding the provisioning request to the provisioning server only if the mutual authentication was successful; wherein the receiving, the mutual authenticating, and the forwarding is performed by a proxy server which bridges communications between a first communications network and a second communications network.

34. The method of claim 33, wherein the first communications network is an airnet; and the second communications network is a wide area communications network.

35. The method of claim 34, wherein receiving the provisioning request is via the airnet and forwarding the provisioning request is via the wide area communications network.

36. The method of claim 35, wherein the proxy server exchanges information between the two-way mobile communication device and the provisioning server via mutually exclusive secure communications sessions with the two-way mobile communications device and the provisioning server, respectively.

37. The method of claim 36, wherein the proxy server and the provisioning server are included in a single server device.

38. A proxy server comprising a processor and a memory coupled thereto, the memory storing instructions which when executed by the processor cause the processor to perform a method comprising:
- receiving a provisioning request from a two-way mobile communications device;
- mutually authenticating the two-way mobile communications device and a provisioning server; and
- forwarding the provisioning request to the provisioning server only if the mutual authentication was successful.

39. The proxy server of claim 38, wherein the proxy server bridges communications between a first communications network and a second communications network.

40. The proxy server of claim 39, wherein the first communications network is an airnet; and the second communications network is a wide area communications network.

41. The proxy server of claim 40, wherein receiving the provisioning request is via the airnet; and forwarding the provisioning request is via the wide area communications network.

42. The proxy server of claim 41, which operates to exchange information between the two-way mobile communications device and the provisioning server via mutually exclusive secure communications sessions with the two-way mobile communications device and the provisioning server, respectively.

* * * * *